Aug. 11, 1970     R. DUNSBY     3,523,849

SHEET MATERIAL FOR USE IN BUILDING

Filed May 3, 1965

United States Patent Office 3,523,849
Patented Aug. 11, 1970

3,523,849
SHEET MATERIAL FOR USE IN BUILDING
Roger Dunsby, Slagen, near Tonsberg, Norway
Filed May 3, 1965, Ser. No. 452,804
Claims priority, application Norway, May 5, 1964,
153,133
Int. Cl. B29c 1/00
U.S. Cl. 156—242
6 Claims

ABSTRACT OF THE DISCLOSURE

A sheet material having utility as a construction material and a method for its production in which a synthetic resin binder is placed in a mold and a layer of fibrous material is pressed into the binder to form a reinforcing layer of fibrous material embedded in the binder near the bottom surface of the mold. A filler is then dispersed in the binder layer and a second layer of fibrous material is then placed on the binder and pressed thereinto to a level somewhat below the surface of the binder whereby an assembly is formed containing the layer of filler sandwiched between the two reinforcing layers. An even layer of a crushed stone material is then sprinkled on the binder and pressed partly thereinto whereby the surface of the assembly thereat has the appearance of a stone surface. Finally, the synthetic resin binder is cured whereby to form said sheet material.

---

Figure 1:
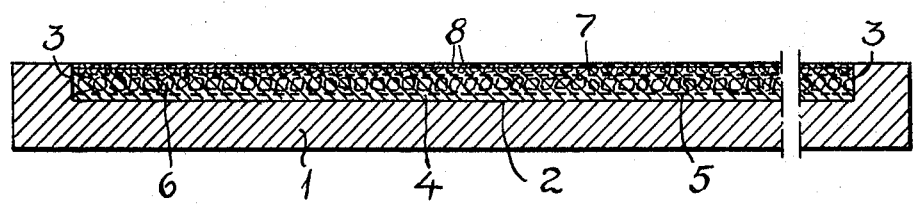

This invention relates to sheet material for use in building, and especially to sheet material useful as a weather protective and/or decorative facing for buildings. The invention is particularly concerned with such sheet materials which comprise a mixture of synthetic resin binder and one or more fillers reinforced with a fibrous fabric or mat.

In sheets of this type known in the art, a glassfibre reinforcement has been embedded near the rear side of sheets consisting essentially of a synthetic resin binder containing a filler, the latter appearing as a decoration or pattern at the front surface of the sheet. These sheets, which are desirably resistant to fracture by impact or bending, are in general relatively thick and have a relatively high weight per unit area principally due to the fact that the fillers which are admixed with the binder must of necessity be of the type which form a satisfactory design on the facing surface; such fillers usually have a high density and may also be expensive. Furthermore as the sheets have but a single reinforcing layer which is situated to one side of the center plane of the sheet, bending stresses during handling of the sheet may easily lead to breakage or crack formation at the front surface of the sheet remote from the reinforcing layer.

According to one feature of the invention, there is provided sheet material for use in building which comprises at least one layer of filler held together by a synthetic resin binder, there being embedded into the sheet material near each of the two sides thereof a layer of fibrous material as reinforcement.

According to a further feature of the invention there is provided a method of producing sheet material as hereinbefore defined which comprises the steps of (1) providing in a mould for the sheet material a layer of synthetic resin binder, (2) placing on the layer of synthetic resin binder a layer of fibrous material, (3) pressing the layer of fibrous material down through the layer of synthetic resin binder to form a reinforcing layer of fibrous material embedded in the synthetic resin binder near the bottom surface of the mould, (4) dispersing in the layer of synthetic resin binder a finely divided filler, (5) placing on the filled layer of synthetic resin binder a second layer of fibrous material, (6) pressing down the second layer of fibrous material whereby it is embedded into the filled layer of synthetic resin binder and (7) curing the synthetic resin binder.

According to a still further feature of the invention, there is provided a modification of the above-defined process in which steps (1) to (3) are replaced by the steps of (1a) providing a layer of fibrous material on the bottom of a mould for the sheet material and (2a) providing a layer of synthetic resin binder on the said layer of fibrous material.

Sheet material according to the invention in general can be produced substantially thinner and consequently lighter than the known sheet materials of the same type whilst having in general a satisfactory rigidity and resistance to cracking on impact and binding.

In a preferred embodiment of the invention, there is provided on top of the layer of fibrous material on one side of the sheet material a layer of filler bonded to the sheet material by a synthetic resin binder. The side of the sheet material thus treated can with advantage be the weather-protective or decorative side of the material. Thus, a filler suitable for weather-protective and/or decorative purposes can be used for this facing layer, whilst a cheaper and/or lighter filler may be used for the part of the sheet which is sandwiched between the two reinforcing layers of fibrous material. Thus, by reducing the thickness of the so-called facing layer, the cost and/or the weight of the sheet material per unit area can be substantially reduced.

Figure 2:
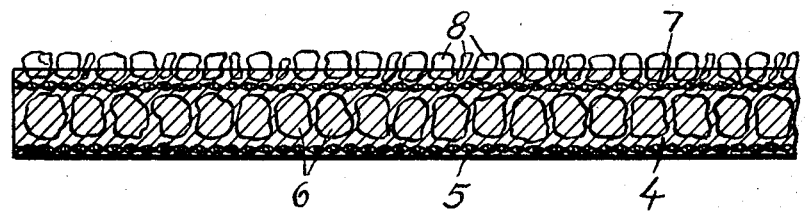

The invention is now further described with reference to the accompanying drawings in which:

FIG. 1 is a cross-section of a mould for carrying out the method according to the invention; and FIG. 2 is an enlarged cross-section of a portion of a sheet material according to the invention.

The following description is given in relation to the preparation of a sheet having an area of 10.8 sq./ft. and a thickness of 3/16" using the mould 1 shown in FIG. 1. The latter has an upwards-opening mould compartment with a smooth flat bottom surface 2 and side walls 3 of a height which conveniently corresponds to the thickness of the finished sheet.

The mould compartment is previously provided with a coating of a suitable release agent.

As a binder, synthetic resins such as polyester and epoxy resins are conveniently used in conjunction with appropriate curing agents. The binder may, if desired, be admixed with a finely divided filler, for example limestone (e.g. crushed marble), conveniently having a particle size not exceeding 1/27" before introduction into the mould. One suitable mixture of binder and filler contains about 43.4% by weight filler to about 29.3% by weight binder. This mixture is introduced into the mould in a suitably thick even layer 4. A glass fibre reinforcement in the form of a mat or open fabric 5 adjusted to the area of the sheet is placed on the layer of binder in the mould and is pressed down through this layer, e.g. by rolling or by other suitable means, until it comes to rest against the bottom of the mould 2. Due to the fineness of the filler this will be able to pass through the reinforcement together with the binder.

Although the method is described herein with reference to the use of glass fibres as a reinforcement, the layer of fibrous materials may be provided by fibrous materials other than glass, e.g. jute and the like. Preferably the fibrous material is in the form of a fabric or mat of fibrous material.

On the layer 4 of binder now on top of the reinforcement 5, an even layer of crushed limestone 6 in an amount of about 11% by weight and having a particle size not exceeding 0.12" (preferably not exceeding 0.06") is sprinkled, whereafter a glass fibre reinforcement 7 similar to that described above, is placed upon the layer of limestone 6 and is pressed together therewith against the bottom of the mould in the above described manner until the reinforcement 7 on the upperside is covered by a suitable layer of binder. The filler 6 (that is the filler which is sandwiched between the two reinforcing layers) may be provided by materials other than limestone, e.g. by sand, gravel, crushed natural stone, mica, Leca particles or perlite having a particle sieve not exceeding 0.12".

Finally, about 16.4% by weight of crushed limestone 8 (conveniently having a particle size of from 0.06 to 0.12") is sprinkled evenly over the surface of the binder and pressed to bond the limestone securely to the sheet. Instead of crushed limestone, sand, gravel or other crushed natural stone, also preferably having a particle size of from 0.06 to 0.12", can with advantage be used.

The sheet which is thus formed and pressed together may subsequently be cured at a temperature of about 80–100° C., depending upon the curing agent used, conveniently for a period of time of about 5 minutes.

In the thus prepared sheet a resin-bonded filler layer of a material having a density which may be selected as desired, e.g. sand, gravel or crushed natural stone, mica, Leca particles, perlite, etc. is obtained between two glass fibre reinforcements, and the finished sheet on the one side (which in practice will be the outer side) has a surface strengthening and/or decorative layer of sand, gravel, crushed natural stone or the like which is bonded to the sheet and forms a connected assembly therewith. The surface strengthening and/or decorative layer may also consist of tiles (e.g. ceramic tiles) which are pressed more or less into the binder and are thereby securely bonded to the sheet material.

The sheet produced according to the invention has satisfactory rigidity and resistance to cracking by impact and bonding. As stated above, it may be produced substantially thinner and lighter per unit area than previously known sheets of similar type, the positioning of a reinforcement at each side of the sheet providing elasticity at the most exposed places, i.e. at the surfaces.

In the above described preparation of a sheet of 10.8 sq. ft. the following materials were employed:

| | Grams |
|---|---|
| Polyester resin (Delipol 1 B 3) | 2.100 |
| Curing agents: | |
| Cyclonoxy | 21 |
| Cobalt naphthenate | 21 |
| Crushed marble flour (0–0.2 mm.) | 3.150 |
| 2 pieces 39, 37 x 39, 37" 300 gram glass fibre mats | 600 |
| Crushed limestone (0–1/127") | 800 |
| Crushed limestone (0.12–0.24") | 1.200 |

Instead of polyester resin other suitable synthetic resins such as for example epoxy resins (Epikote 828) with diethylene triamine as the curing agent, may be employed.

If desired, the crushed marble flour referred to may be replaced by the same amount by weight of the synthetic resin binder. In other words, the layer 4 in FIG. 2 of the drawings may consist essentially of synthetic resin binder alone in which crushed limestone 6 is dispersed.

As mentioned above, in the carrying out of the present method any filler which is suitable for a particular purpose such as for example sand, gravel, crushed natural stone, mica, Leca particles, perlite, etc., may be employed and taking into consideration the desired thickness of the finished sheet and the selection of the filler, the given proportions of the ingredient may be varied accordingly. When carrying out the method the reinforcement may first be placed in the mould and the binder subsequently filled therein but to ensure that the reinforcement is surrounded entirely by binder, especially when the binder is admixed with filler, it is preferred to press the reinforcement through the layer of binder. A further advatnage of the latter technique is that the formation of air bubbles in the sheet is also prevented thereby.

I claim:
1. A method of producing sheet material for use in building, which method comprises providing in a mold for the sheet material a layer of a synthetic resin binder, placing on the layer of said binder a layer of fibrous material, pressing said layer of fibrous material into the binder layer to form a reinforcing layer of fibrous material embedded in said binder layer near the bottom surface of the mold, dispersing a filler in the binder layer, placing on said binder layer containing said filler, a second layer of fibrous material, pressing the second layer of fibrous material into the binder layer to a level somewhat below the surface of said binder layer, sprinkling on the binder layer on top of the second layer of fibrous material, an even layer of a crushed stone material, pressing said layer of crushed stone material partly into the surface of the binder layer and curing the synthetic resin binder.

2. A method as claimed in claim 1 in which at least one of the reinforcing layers is in the form of a fabric of fibrous material.

3. A method as claimed in claim 1 in which the fibrous material of at least one reinforcing layer comprises glass fibres.

4. A method as claimed in claim 1 in which the fibrous material of at least one reinforcing layer comprises jute fibres.

5. A method as claimed in claim 1, in which the binder comprises a filler of crushed stone, having a particle size not exceeding 1/127".

6. A method as claimed in claim 1, in which the filler comprises limestone having a particle size not exceeding 0.12".

References Cited

UNITED STATES PATENTS

| 2,096,242 | 10/1937 | Harshberger | 161—162 |
| 2,284,716 | 6/1942 | Benner et al. | 161—162 |
| 2,612,462 | 9/1952 | Zettel | 161—162 |
| 2,806,509 | 9/1957 | Bozzacco et al. | 161—162 |
| 3,035,310 | 5/1962 | Sokol et al. | 156—245 |

MORRIS SUSSMAN, Primary Examiner

U.S. Cl. X.R.

156—62; 161—151, 158, 162